Oct. 9, 1956 — E. P. SCRUGGS — 2,765,577
BOAT FISHERMAN'S CREEL
Filed April 23, 1953
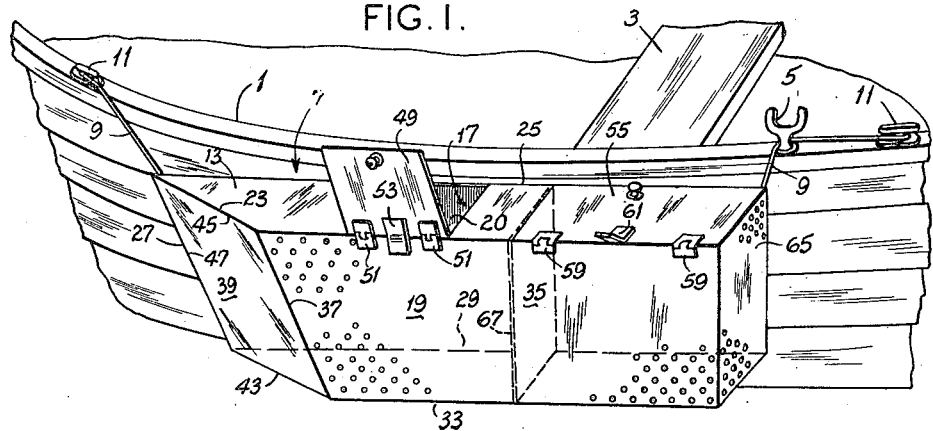
FIG. 1.
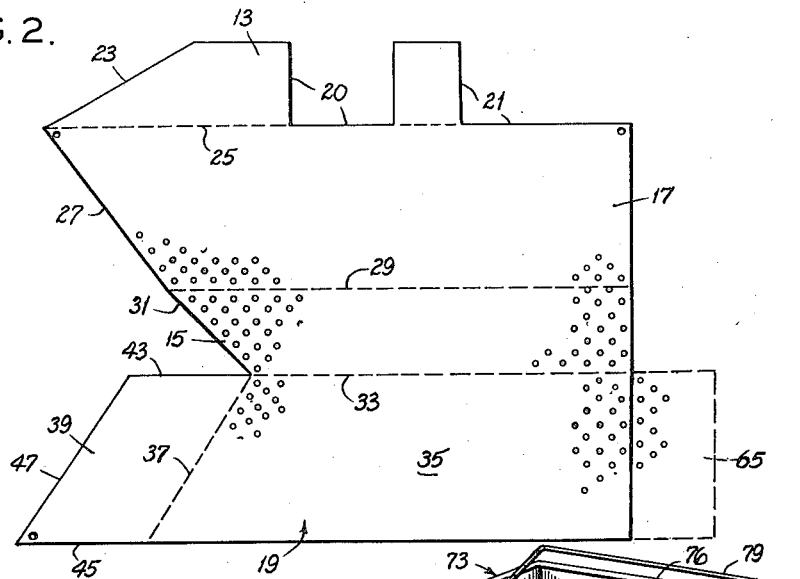
FIG. 2.
FIG. 4.
FIG. 3.
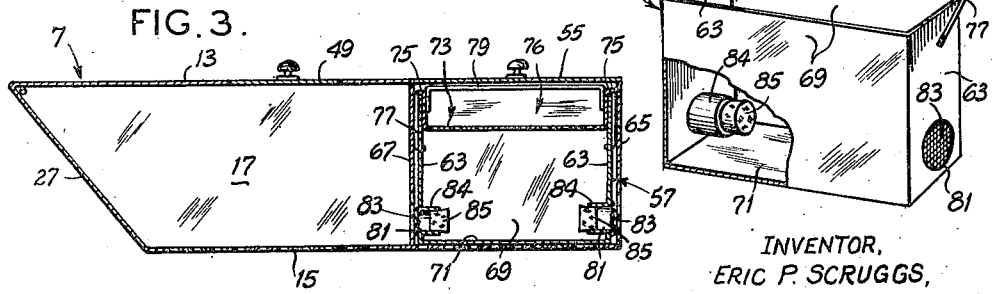
INVENTOR,
ERIC P. SCRUGGS,
BY Bruninga and Sutherland,
ATTORNEYS.

United States Patent Office 2,765,577
Patented Oct. 9, 1956

2,765,577

BOAT FISHERMAN'S CREEL

Eric P. Scruggs, England, Ark.

Application April 23, 1953, Serial No. 350,705

1 Claim. (Cl. 43—55)

This invention relates to creels for use in preserving fish caught while fishing from a typical fishing boat.

To the successful fisherman, there is a real problem in preserving fish caught early in the day. If the climate is mild, a fish which is merely tossed onto the bottom of the boat is likely to spoil before the day's activities have been concluded. For this reason it has been the common practice to secure the fish on a stringer which is trailed along in the water alongside the boat. Although the life is thereby prolonged, the procedure has certain disadvantages. Frequently turtles and the like will locate the stringer and if not detected, will destroy the entire catch. Moreover, the stringing operation is troublesome to the fisherman and injurious to the fish. And if the stringer is not pulled in whenever the boat is moved under power to a new location, the fish may be torn off. These difficulties have in turn led to the development of boats wherein a compartment is built in under one of the seats to provide for storage of fish, the compartment being open to the water but screened off at the bottom. Such arrangements are expensive, however, hence the fisherman arriving at a typical lake all too frequently is left only with the choice of taking his chances with spoilage or the turtles. Accordingly, it is an object of the invention to provide an inexpensive, portable container for use alongside a boat to preserve a catch of fish.

In addition, the invention contemplates the provision of an improved container for live bait. Various types of minnow buckets are known in the art but no one is entirely satisfactory. The insulated bucket is convenient to handle inasmuch as it can be readily carried to and from the boat, but the time over which the bait can be kept in good condition is somewhat limited. There are other types of buckets which may be floated alongside the boat and which are thereby more or less continuously supplied with fresh water, but such containers are expensive and inconvenient to handle. It has even been proposed that an open-mesh container be fastened to the outer side of a boat, but this particular container does not permit transportation of the bait, as from the supplier to the boat. Accordingly, it is also an object of the invention to provide for the storage of live bait on the outer side of a boat but in such a way as to permit its transportation to and from the boat.

Among the other objects of the invention may be noted the provision of a lightweight and simple construction for containers of the character described; the provision of a container in which fish may be accumulated over several days without danger of injury; and the provision of a container which may be removed from the boat and readily transported, as by automobile.

In achieving these objectives, I provide a container which is constructed from perforated metal or the like, with one side shaped to fit alongside a boat and the other side shaped to afford a streamlined effect. Such a container may be readily manufactured from a sheet metal blank by cutting, folding and welding the blank in the manner herein disclosed. A top door is hinged adjacent the outer side of the container to swing away from the boat and a stop limits outward movement of the door so that it may function as a guard, preventing inadvertent loss of an especially slippery fish over the side of the container while being manipulated into the container. Cords or the like are employed to secure the box and facilitate subsequent removal for transportation from the boat.

This container may also accommodate a removable bait bucket. In a preferred form, the bucket is constructed to hold water but is provided with screened openings which may be unplugged after the bucket has been nested within the main container, in order to permit fresh water to circulate through the bucket. The top of the bucket may also be apertured and shaped to receive a supply of ice.

Other features of the invention will be in part apparent from and in part pointed out in the following detail description taken in connection with the accompanying drawings, in which:

Fig. 1 is an oblique view illustrating the creel of this invention;

Fig. 2 is a plan view of a blank from which the container of Fig. 1 may be manufactured;

Fig. 3 is a vertical section taken longitudinally through the container and showing the arrangement of the bait bucket therein; and, Fig. 4 is an oblique view of the bait bucket parts being broken away.

Referring now to the drawings, the side 1 of a boat is partially shown in Fig. 1. The boat may be any typical fishing boat, including a seat 3 and oarlocks 5 used for more involved maneuvering, it being understood that it is common to use an outboard motor for general travel. The creel 7 herein disclosed is shown to be mounted against the side 1 as by cords 9, which are removably secured on cleats 11.

This creel is preferably formed of conventional perforated metal in order to minimize weight and reduce costs. As shown in Fig. 2, a blank is cut out in such a shape and prepared for folding so as to provide top and bottom panels 13 and 15 extending from a side panel 17 and another side panel 19 extending from the bottom panel. Portions of the top are cut away at 20 and 21 to form door openings and one end is tapered inwardly at 23 from a fold line 25 defining the inner top edge of the container. The panel 17, which forms the inner side of the box, has an end edge 27 which converges toward a bottom line 29, and the bottom panel in turn has an end edge 31, which converges more sharply to a fold line 33 where the other side panel begins. This outer side panel 19 has a main part 35 defined by a fold line 37 diverging from the end of line 33 and a flap 39 extending beyond the fold line 37. This flap has parallel edges 43 and 45, at what is ultimately the bottom and top of the box, and a divergent edge 47 at what is ultimately the front end.

It will be apparent that the blank of Fig. 2 may be readily folded along the lines indicated to form parallel inner and outer sides 17 and 35, a top 13 and a bottom 15. The flap 39 is folded inwardly along line 37 and is welded or otherwise secured at its edges 43, 45 and 47, respectively, to the edge 31 of the bottom panel 15, the edge 27 of the side panel 17 and the edge 23 of the top panel 13. The back of the box may be formed from another part of the blank which has been cut away at the door opening 21, or it may be formed in the same way as the front. The box is consequently quite simple to manufacture, yet provides a streamlined shape facilitating movement of the boat through the water. If desired, however, the panel 39 forming the front end may be made of stock which is relatively more closed, so as to further facilitate streamlining and avoid heavy flow of water through the box during movement of the boat.

A door 49 is mounted adjacent the front on the outer side 35, as by hinges 51, and a stop 53 is provided to limit outward movement of the door. This arrangement is desired in order to manipulate a fish into the container, the opened door forming an abutment which prevents a slippery fish from getting away over the outer side. The door opening may be relatively small or guarded in order to prevent fish within the box from jumping out.

A second door 55 is provided at the rear of the container for access to a bait bucket 57 received therein. This door is also hinged at 59 to swing away from the boat and it may carry a stop 61 to limit its outward movement. As shown in Figs. 3 and 4, the bait bucket is of a box shape with end walls 63 which fit snugly between the rear end wall 65 and a cross brace 67 on the main container. The side walls 69 of the bucket fit snugly between the side walls 17 and 35 of the larger container, whereas the bottom 71 of the bucket is closed over and the top adapted to receive a removable cover 73. This cover has flanges 75, which seat on the upper edges of the bucket, and a depressed apertured central portion 76 which may hold a supply of ice. Bails 77 and 79, respectively, are provided to facilitate removal of the bucket, and the cover independently of one another. To provide for circulation of fresh water, there are openings 81 in the two end walls 63. These openings are screened over at 83 and have inwardly projecting collars 84 which may be plugged with corks 85. When the bait bucket is removed from the perforated container, the openings 81 are plugged and ice may then be placed on the cover 73 so that cold water will drip into the bucket and maintain the bait in good condition. In use during fishing, the bucket is nested within the larger container and the corks 85 are removed so that fresh water flows through the bucket.

As fish are caught, they are quickly and conveniently dropped into the forward compartment of the container through the door opening 20. Inasmuch as there is a continual replenishing of the water, these fish are maintained in a live condition, although they are protected from their enemies. Consequently, the fish may be left in the container throughout the day or even over a period of several days.

Although only one embodiment of the invention is described in detail, it will be understood that various modifications will present themselves to those skilled in the art without departing from the spirit of the invention. For example, where a bait bucket is not required, the container may be shortened and tapered at both ends so that it can be mounted on either side of the boat. Whereas cords are shown as a means of attachment to the boat, other fasteners can be employed. Although it is preferred that the large container be formed entirely of perforated metal for economy and reduction of weight, this is not essential provided sufficient openings are provided to insure adequate circulation of fresh water. Moreover, the various panels may be in part hinged to one another and in part detachable to permit collapse of the container during transportation and storage.

From the foregoing description, those skilled in the art will readily understand that the invention accomplishes its objects in an expeditious, facile and economical manner.

Having thus described the invention, what is claimed and desired to be secured by Letters Patent is:

A boat fisherman's creel comprising a perforate container which is partially submerged in use, a comparatively small bait bucket removably telescoped within said large container for partial submergence therewith, said container having an upper opening through which said bucket telescopes, and said bucket having closable water-circulating openings adjacent its bottom into said container, said bucket otherwise being relatively imperforate.

References Cited in the file of this patent

UNITED STATES PATENTS

| Number | Name | Date |
|---|---|---|
| 163,498 | Kepner | May 18, 1875 |
| 1,373,830 | Petty | Apr. 5, 1921 |
| 1,476,230 | Thompson | Dec. 4, 1923 |
| 1,619,634 | Roat | Mar. 1, 1927 |
| 1,620,617 | Marsh et al. | May 8, 1927 |
| 1,934,815 | Parrott | Nov. 14, 1933 |
| 2,403,858 | Groom et al. | July 9, 1946 |
| 2,560,054 | Wells | July 10, 1951 |
| 2,566,719 | Dick | Sept. 4, 1951 |
| 2,595,726 | Swanbeck | May 6, 1952 |
| 2,597,002 | Johnson et al. | May 20, 1952 |
| 2,631,402 | Lastofka | Mar. 17, 1953 |
| 2,634,436 | Plaziak | Apr. 14, 1953 |
| 2,651,137 | Sweet | Sept. 8, 1953 |